Patented May 10, 1927.

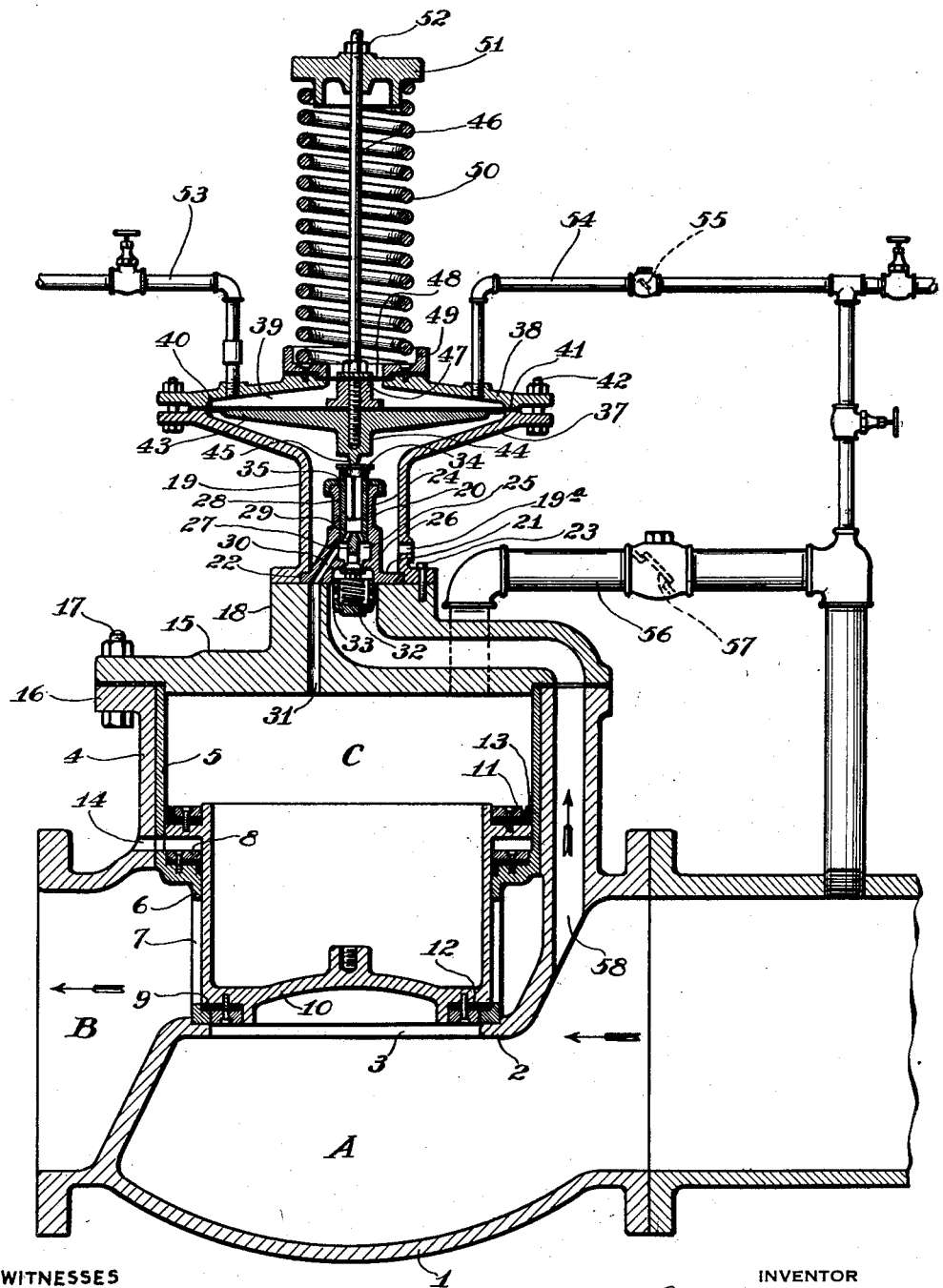

1,627,628

UNITED STATES PATENT OFFICE.

EDWARD V. ANDERSON, OF BELLE VERNON, PENNSYLVANIA, ASSIGNOR OF ONE-HALF TO CHARLES E. GOLDEN, OF CRAFTON, PENNSYLVANIA.

AUTOMATIC CONTROL VALVE.

Application filed January 3, 1927. Serial No. 158,496.

This invention relates to valves, more particularly to automatically regulated control valves.

The present invention is a modification of the valve mechanism illustrated and described in my Patent No. 1,546,356 issued July 21, 1925, and it is among the objects of this invention to provide a valve embodying automatic regulating means for maintaining any predetermined or desirable water level in storage tanks, stand pipes, reservoirs or the like.

Another object of the invention is to provide a valve which shall be adapted to automatically open and close to regulate the supply of water to a tank or the like and which in addition shall be adapted to open upon the failure of pressure on its inlet side.

For some kinds of service it is desirable to employ a single pipe line for maintaining a supply of water in a tank, stand pipe, or reservoir and for distributing the water supply, and it is one of the principal objects of this invention to provide a valve suitable for controlling the flow of water in both directions of the line in which it is connected.

In the accompanying drawing constituting a part hereof and in which like reference characters designate like parts, the single figure is a vertical sectional view partially in elevation of a valve embodying the principles of this invention.

In the drawing 1 designates the valve casing provided with a fixed diaphragm 2 having an opening 3 to establish communication between the intake and the delivery side of the valve. Concentric with the opening 3 of the diaphragm 2 is a cylinder 4 provided with a liner 5 having a constricted offset concentric portion 6 joined thereto or formed integrally therewith, the portion 6 being provided with perforations 7 of any suitable shape. The cylinder 5 at the shoulder between it and the restricted portion 6 is provided with suitable packing 8 and the constricted portion of the cylinder at its extremity is offset to constitute a radial flange 9 which forms a valve seat.

A piston valve 10 provided with a flange portion 11 is disposed in the cylinder 5 having its main body portion slidably engaged with the restricted portion 6 of the cylinder. The valve 10 at its lower extremity is provided with a suitable packing 12 which contacts with the seat 9 and its radial flanged portion 11 is also provided with a cup-shaped packing 13 to provide a seal for the valve and the cylinder 5. A port 14 is provided in the wall of the valve casing to provide an opening for the space or chamber between the flange element 11 of the valve or piston member and the shoulder portion 8 of the cylinder member to establish communication with the atmosphere.

The cover member 15 is secured to the flange portion 16 of the valve casing by suitable bolts 17 and the cover member is provided with a vertically extending boss 18 on which is seated a casing 19 and a pilot valve housing 20. The members 19 and 20 are assembled with the main valve casing by providing a flanged base 21 on the casing member 20 which fits into a counter-bore 22 of the member 19, and the latter is secured by suitable bolts 23 to the boss 18 of the valve casing, thereby assembling and firmly holding the pilot valve housing 20 thereon.

The housing 20 is provided with a central opening 24, an inner chamber 25 and a valve seat 26. A valve stem 27 terminating in a sleeve portion 28 is disposed in the opening 24 of the housing 20 and is adapted for vertical reciprocatory movement therein. The valve 27 closes on the seat 26 of the valve housing and is provided with ports 29 communicating with the inner chamber 25. A port 30 is provided to connect the chamber 25 with a passage 31 provided in the valve head or cover 15. The valve stem 27 is biased in its closed position by a coil spring 32 that is contained in the perforated sleeve 33 which is secured by screw-threaded engagement to the underside of the valve housing 20, as shown.

Within the sleeve portion 28 of the valve 27 is disposed an exhaust valve 34 having a fluted stem 35 constituting a guide for the valve in its movement in the bore of the sleeve 28 of the valve 27.

The casing member 19 is provided with a flared end 37 which cooperates with a similarly shaped cover member 38 to constitute a diaphragm chamber 39. A diaphragm 40 is secured between the members 37 and 38 by being clamped around its outer edge by the engaging faces 41. The diaphragm is secured in its clamped position by a plurality of bolts 42 that are symmetrically spaced around the flanges of the members 37 and 38. The diaphragm 40 is supported on a disc 43 having a spindle portion 44 the end of which terminates in a head 45 that is adapted to seat on the exhaust valve 34.

The diaphragm 40 and the disc 43 are joined by a rod 46 which extends through the diaphragm 40 and is in screw-thread engagement with the disc 43. A sleeve nut 47 also in screw-thread engagement with the rod 46 functions as a locking nut for the diaphragm and disc. A second diaphragm 48 is secured on the cover portion 38 by a flanged ring 49 which functions as a seat for a coil spring 50.

The upper end of the spring is provided with a spring seat 51 which is secured in spaced relation with the spring base 49 by means of a nut 52 that interacts with the screw-threaded portion of the upper part of the rod 46.

The cover member 38 of the diaphragm chamber is connected by a pipe line 53 to the reservoir or storage tank, and the pipe line 54 to the supply source or inlet side of the valve. A one-way swing valve 55 is provided in the line 54 to permit flow of water in one direction only, namely, toward the inlet side of the valve.

The inlet side of the valve is further provided with a by-pass 56 which communicates with the chamber in the cylinder 5 and is provided with a one-way swing valve 57 permitting flow of water out of the cylinder chamber to the inlet side of the valve but not in the opposite direction. A passage 58 is provided in the valve casing and its cover, 1 and 15, respectively, to establish communication between the intake side of the main valve and the pilot valve.

The operation of the valve is briefly as follows: Assuming the normal flow of water to be in the direction of the arrow entering the valve at the intake side, and that the source of supply is normally of greater pressure than the head on the delivery side of the valve, the pressure acting against the valve or piston member 10 will tend to raise the latter and permit the flow of water through the perforations 7 in the cylinder wall 6 to the tank or reservoir.

The pressure responsive device comprising the diaphragm 40 and the spring element 50 is set for a predetermined head or water level in the storage tank by adjusting the nut 52 of the stem 46, the nut 52 being screwed down for a higher water level and screwed up on its stem 46 for a lower water level.

When the head in the tank or reservoir exceeds that for which the pressure responsive device has been adjusted the pressure above the diaphragm 40 will produce a downward movement of its supporting disc 43, whereby its spindle portion 44 through the head 45 will press on the exhaust valve 34 firmly seating it on the valve 27, and upon continued downward movement the valve 27 will be pushed off its seat 26. With the valve 26 open, water will flow through the passage 58 into the chamber 25, thence through the ports 30 and 31 into the cylinder 5 or main valve chamber. The area of the rear of the valve 10 being greater within the cylinder chamber 5 than that exposed at the bottom of the valve in the cylinder portion 6, the pressure within the cylinder will overcome the pressure exerted on the valve in the direction of the flow of fluid forcing the valve to its seat 9.

When the water level in the reservoir or tank has dropped below the pressure for which the pressure responsive device is adjusted, the pilot valve 27 which is normally biased by its spring 32 will close on its seat 26 thereby shutting off passage 58. Water in the main valve cylinder will pass through the ports 31 and 30 into the chamber 25 thence through the ports 29 into the hollow stem of the valve 27 lifting the exhaust valve 34 and overflowing into the chamber between the casing 19 and the pilot valve housing 20, from which it escapes through the port 19$^a$. The pressure on the intake side of the valve will again lift the valve cylinder 10 to open the passage and the valve will continue to supply the reservoir until the predetermined water level is again exceeded.

The by-pass connections 54 and 56 function to open the valve 10 when pressure fails on the inlet side of the valve. This is desirable when a single pipe line is employed in connecting a reservoir, tank, or stand pipe with a source of water supply, and in addition, to function as a distribution system of water from the filled reservoir, tank, etc.

In accordance with this invention when the valve 10 is in the closed position shown in the drawing with a certain water level established in the reservoir or storage tank, upon a release of the pressure in the supply line on the intake side of the valve, which is also the distribution side of the system, the lower chamber A of the valve and the portion of the supply line on its intake side will be evacuated. A vacuum or a partial vacuum in the by-pass 54 and 56 will relieve the diaphragm 40 from pressure, permitting the pilot valve 26 to seat, and the cylinder chamber C above the valve 10 will be exhausted through the by-pass 56, which raises the valve 10 from its seat 9 and permits a flow of water from the outlet side B of the valve to the inlet side A through the main opening 3 thereof.

The vacuum applied to the cylinder chamber through the by-pass 56 is effected through a complete failure of pressure on the intake side of the valve such as is caused by a sudden opening of the pipe line connected with the inlet side of the valve. The withdrawal of the water from the inlet side of the valve exhausts the valve chamber C and a portion of the pipe in the region of the by-pass 56. The resulting vacuum exhausts the cylinder chamber C and raises the valve 10 to its open position.

It will be evident from the foregoing description of this invention that the valve described therein provides a simple, efficient and reliable means for maintaining a supply of water in a storage tank at a predetermined level, and in addition permits returning the storage water for distribution through the same water line through which it has been supplied.

Although a given embodiment of the invention has been herein described it will be obvious to those skilled in the art that various modifications may be made in the details of construction and in the arrangement of the several cooperating parts without departing from the principles herein set forth.

I claim:

1. A valve mechanism comprising a casing having a passage therethrough, a valve controlling the passage and adapted to seat by movement in a direction opposed to that of normal flow of fluid through the passage, means responsive to increase of pressure on one side of said valve for automatically seating said valve, and means responsive to failure of pressure on the other side of said valve for automatically unseating said valve.

2. A valve mechanism comprising a casing having a passage therethrough, a main valve controlling the passage and adapted to seat by movement in a direction opposed to that of normal flow of fluid through the passage, a pilot valve communicating with the valve passage on both sides of said main valve, a pressure responsive device for actuating said pilot valve whereby to seat tne main valve and to release the same, and automatic pressure-operated means independent of said pilot valve for opening said main valve.

3. A valve mechanism comprising a casing having a passage therethrough, a piston valve disposed in a cylindrical chamber of said casing for controlling the passage and adapted to seat by movement in a direction opposed to that of normal flow of fluid through the passage, a pilot valve adapted to establish communication with the cylindrical chamber of said piston valve and one side of the valve passage whereby to fill said chamber and close the piston valve, a pressure responsive device for actuating said pilot valve whereby to open and close said piston valve, and automatic means independent of said pilot valve for exhausting the valve cylinder for opening the piston valve.

4. A valve mechanism comprising a casing having a passage therethrough, a piston valve disposed in a cylindrical chamber of said casing for controlling the passage and adapted to seat by movement in a direction opposed to that of normal flow of fluid through the passage, a pilot valve adapted to establish communication with the cylindrical chamber of said piston valve and one side of the valve passage whereby to fill said chamber and close the piston valve, a pressure responsive device for actuating said pilot valve whereby to open and close said piston valve, and a by-pass connection from said valve cylinder to the inlet side of said valve passage whereby to automatically evacuate said cylinder and open said piston valve upon failure of pressure on the inlet side thereof.

5. A valve mechanism comprising a casing having a passage therethrough, a piston valve disposed in a cylindrical chamber of said casing for controlling the passage and adapted to seat by movement in a direction opposed to that of normal flow of fluid through the passage, a pilot valve adapted to establish communication with the cylindrical chamber of said piston valve and one side of the valve passage whereby to fill said chamber and close the piston valve, a pressure responsive device for actuating said pilot valve whereby to open and close said piston valve, a by-pass connection from said pressure responsive device to the inlet side of said valve passage whereby to relieve the pressure in said device, and a one-way by-pass connection from said valve cylinder to the same side of the passage to evacuate said cylinder and open said piston valve upon failure of pressure in the inlet passage.

6. A double acting valve mechanism comprising a casing having a passage therethrough, a main valve controlling the passage, a pilot valve normally controlling the opening and closing of said main valve, a pressure responsive device exposed to fluid pressure on one side of the main valve for actuating said pilot valve, and a one-way by-pass on the other side of the main valve to automatically permit opening of said main valve upon failure of pressure on that side thereof.

7. A double acting valve mechanism for water supply lines comprising a casing having a passage therethrough and having a cylinder chamber therein, a double diameter piston valve disposed in said chamber for controlling said passage, and a one-way by-pass from said cylinder to the supply line on one side of the valve whereby to automatically exhaust pressure behind the piston valve when the line to which the by-pass is connected is evacuated.

8. A double acting valve mechanism comprising a casing having a passage therethrough and having a cylinder chamber therein, a double diameter piston valve disposed in said chamber for automatically controlling said passage, said piston valve being adapted for closing said passage for movement in a direction opposed to the normal flow of fluid, and a one-way by-pass connecting the cylinder chamber to the inlet side of the main valve whereby to exhaust the cylinder and open the valve upon failure of pressure on the inlet side of the main valve.

9. A valve casing having a passage therethrough, a cylinder therein, a double diameter piston mounted in the cylinder, the end of the smaller bore of the piston constituting a valve controlling said passage, automatic pressure regulated means responsive to pressure on the outlet side of the casing for opening and closing the valve, and a one-way by-pass from the cylinder to the inlet side of the valve, whereby to exhaust the cylinder upon failure of pressure on the inlet side of the valve whereby to open the valve independently of pressure on the outlet side thereof.

10. A valve mechanism for controlling a water main, comprising a casing having an inlet and an outlet chamber, a valve controlling a port between said chambers, a cooperative cylinder and piston controlling said valve, said valve being adapted to seat to close the port upon increase of pressure in the main on one side thereof, and a by-pass from the cylinder to the main on the other side of the valve, whereby to exhaust pressure in the cylinder to open the valve on failure of pressure in the main on the side to which the by-pass extends.

In testimony whereof, I sign my name.

EDWARD V. ANDERSON.